US006761501B1

(12) United States Patent
Nakatani

(10) Patent No.: US 6,761,501 B1
(45) Date of Patent: Jul. 13, 2004

(54) TELESCOPING DEVICE AND TRIPOD

(75) Inventor: Koichiro Nakatani, Tokyo (JP)

(73) Assignee: Nihon Velbon Seiki Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/830,048

(22) PCT Filed: Mar. 15, 2000

(86) PCT No.: PCT/JP00/01571

§ 371 (c)(1),
(2), (4) Date: Apr. 19, 2001

(87) PCT Pub. No.: WO01/14786

PCT Pub. Date: Mar. 1, 2001

(30) Foreign Application Priority Data

Aug. 23, 1999 (JP) ............................................ 11-236183

(51) Int. Cl.⁷ ................................................ F16B 7/10
(52) U.S. Cl. ............................... 403/109.5; 403/109.2; 403/109.8; 403/350; 403/374.1
(58) Field of Search .......................... 403/109.1, 109.2, 403/109.5, 109.8, 350, 374.1

(56) References Cited

U.S. PATENT DOCUMENTS

| | | | | |
|---|---|---|---|---|
| 581,476 A | * | 4/1897 | Blanton, Jr. ................. | 403/350 |
| 2,234,486 A | * | 3/1941 | Craig .......................... | 403/334 |
| 2,284,847 A | * | 6/1942 | Raymond .................... | 359/827 |
| 2,397,382 A | * | 3/1946 | Smith .......................... | 279/102 |
| 3,515,418 A | * | 6/1970 | Nielsen, Jr. ................. | 248/188.5 |
| 4,105,346 A | * | 8/1978 | Gelinas ........................ | 16/429 |
| 4,528,998 A | * | 7/1985 | Gamm .......................... | 135/75 |
| 4,653,142 A | * | 3/1987 | Upton .......................... | 15/144.4 |
| 5,003,328 A | * | 3/1991 | Gaynor ........................ | 248/169 |
| 5,011,319 A | * | 4/1991 | Levi et al. ................... | 403/109.5 |
| 5,108,215 A | * | 4/1992 | Hassid et al. ................ | 403/298 |
| 5,320,348 A | * | 6/1994 | Starrett ........................ | 463/47.6 |
| 5,407,295 A | * | 4/1995 | Kuhl ............................ | 403/343 |
| 5,458,427 A | * | 10/1995 | Simond ........................ | 280/820 |

(List continued on next page.)

FOREIGN PATENT DOCUMENTS

| | | | |
|---|---|---|---|
| CN | 296016 | 1/1997 | |
| JP | 52-62021 | 5/1977 | ........... F16M/11/00 |
| JP | 6-6261 | 2/1994 | ........... F16M/7/14 |
| JP | 3022902 | 1/1996 | ........... F16M/11/32 |

*Primary Examiner*—Gary S. Hartmann
(74) *Attorney, Agent, or Firm*—Darby & Darby

(57) ABSTRACT

Each one of telescopic units (12) that are used for a tripod includes a first tubular member (15). A second tubular member (16) is inserted in the first tubular member (15) so as to be capable of rotating circumferentially and enabling the adjustment of the distance by which the second tubular member (16) projects from the first tubular member (15). Press receiving surface portions (25) having a cross section which has an arc-shaped surface such that the center axis of the arc extends in parallel with the center axis of the first tubular member (15) are formed on the inner cylindrical surface of the first tubular member (15). Press applying surface portions (37) having a cross section which has an arc-shaped surface such that the center axis of the arc extends in parallel with the center axis of the second tubular member (16) are formed on the outer cylindrical surface of the second tubular member (16). Rotation of the second tubular member (16) in one direction circumferentially relative to the first tubular member (15) causes given locations of the press applying surface portions (37) to be pressed against the press receiving surface portions (25). Rotation of the second tubular member (16) in the other direction circumferentially relative to the first tubular member (15) releases the press applying surface portions (37) and the press receiving surface portions (25) from the press-contact with each other.

10 Claims, 7 Drawing Sheets

U.S. PATENT DOCUMENTS

| | | | | |
|---|---|---|---|---|
| 5,460,459 A | * | 10/1995 | Morgan | 285/318 |
| 5,500,982 A | * | 3/1996 | Hosoi | 16/297 |
| 5,622,446 A | * | 4/1997 | Hibberd | 403/109.8 |
| 5,918,348 A | * | 7/1999 | Carpenter et al. | 16/342 |
| 5,957,477 A | * | 9/1999 | Ensz et al. | 280/482 |
| 6,053,508 A | * | 4/2000 | Kuhl | 279/102 |
| 6,292,992 B1 | * | 9/2001 | Kuhl | 279/102 |
| 6,349,449 B1 | * | 2/2002 | Kuehl | 16/332 |

* cited by examiner

TELESCOPING DEVICE AND TRIPOD

TECHNICAL FIELD

The present invention relates to a telescopic unit which is capable of preventing rattling of the telescopic unit when in use. The invention also relates to a tripod provided with said telescopic units.

BACKGROUND OF THE INVENTION

Examples of conventional telescopic units used for a tripod include one having a structure which calls for disposing a second tubular member in a first tubular member in such a way that the distance by which the second tubular member projects from the first tubular member can be adjusted, fixing an operation lever supporting member to the outer cylindrical surface of the lower end of the first tubular member, operating the operation lever supported by said operation lever supporting member so that a brake is pressed against the outer surface of the second tubular member. As a result of the brake being pressed against the second tubular member, the second tubular member is secured to the first tubular member.

However, the telescopic unit described above presents several problems; inclusion of a securing device that consists of an operation lever, an operation lever supporting member and a brake as a means to secure the second tubular member to the first tubular member results in a complex structure. Furthermore, as operating the operation lever each time is troublesome and makes the telescopic unit inconvenient to operate.

Examples of conventionally known devices to solve the above problems although it is of a simple structure as it is not provided with a securing device which consists of an operation lever and other members include a telescopic unit that is capable of easily securing the second tubular member by rotating the second tubular member relative to the first tubular member.

An example of such telescopic units used for tripods is shown in FIG. 12. The telescopic unit shown in FIG. 12 includes a first tubular member 2. A receiving portion 1 that tapers downward is formed at the lower end of the first tubular member 2 so as to prevent undesirable displacement of the first tubular member 2. A second tubular member 3 is positioned in the first tubular member 2 so as to be capable of rotating circumferentially and enabling the adjustment of the distance by which the second tubular member 3 projects from the first tubular member 2. A cam shaft member 4 is screwed to the top of the second tubular member 3, and a cam 5 having a partially cutout cylindrical shape is fitted around the cam shaft member 4.

When the second tubular member 3 is rotated in one direction circumferentially relative to the first tubular member 2, the cam shaft member 4 rotates together with the second tubular member 3. As a result, the cam 5 flares so that a press applying surface 5a of the cam 5 becomes pressed against the inner surface of the first tubular member 2, thereby securing the second tubular member 3 in the first tubular member 2.

However, as the second tubular member 3 is secured in the first tubular member 1 merely by the press applying surface 5a of the cam 5 pressed against a part of the cylindrical inner surface of the first tubular member 2, the conventional telescopic unit shown in FIG. 12 sometimes presents a problem of rattling of the telescopic unit when in use due to insufficient securing force.

In order to solve the above problem, an object of the present invention is to provide a telescopic unit which is not only of simple structure that is convenient to handle but also ensures sufficient securing force to prevent rattling when in use. Another object of the invention is to provide a tripod having the same effects as above.

DISCLOSURE OF THE INVENTION

A telescopic unit according to the present invention includes a first tubular member and a second tubular member, which is inserted in the first tubular member so as to be capable of rotating in the circumferential directions and enabling the adjustment of the distance by which the second tubular member projects from the first tubular member, wherein one or more press receiving surface portions are formed on the inner cylindrical surface of the first tubular member, said press receiving surface portions having a cross section which has an arc-shaped surface such that the center axis of the arc extends in parallel with the center axis of said first tubular member; one or more press applying surface portions are formed on the outer cylindrical surface of the second tubular member, said press applying surface portions having a cross section which has an arc-shaped surface such that the center axis of the arc extends in parallel with the center axis of said second tubular member; rotation of the second tubular member in one direction circumferentially relative to the first tubular member causes given locations of the press applying surface portions to be pressed against the press receiving surface portions, thereby securing the second tubular member to the first tubular member; and rotation of the second tubular member in the other direction circumferentially relative to the first tubular member releases the press applying surface portions and the press receiving surface portions from the press-contact with each other so that the distance by which the second tubular member projects from the first tubular member can be adjusted. With the configuration as above, in the state where the second tubular member is secured to the first tubular member, the press applying surface portions of the second tubular member are pressed against the press receiving surface portions of the first tubular member with securing force that is sufficient compared with the conventional art. As a result of the configuration described above, the present invention provides a telescopic unit which is of simple structure and convenient to handle and, by means of said sufficient securing force, capable of preventing rattling when in use.

According to another feature of the invention, a plural number of press receiving surface portions are formed on the inner surface of the first tubular member of the telescopic unit so that the press receiving surface portions are arranged in the circumferential direction with a distance between each press receiving surface portion and its adjacent press receiving surface portion, and a plural number of press applying surface portions are formed on the outer surface of the second tubular member of the telescopic unit so that the press applying surface portions are arranged in the circumferential direction at locations respectively corresponding to said press receiving surface portions, with a distance between each press applying surface portion and its adjacent press applying surface portion. With the configuration as above, press-contact between each press applying surface portion and the press receiving surface portion which faces the press applying surface portion ensures sufficient securing force distributed in the circumferential direction.

According to yet another feature of the invention, a receiving step portion is formed between each press receiving surface portion and its adjacent press receiving surface portion of the first tubular member, and a catching step portion that is adapted to catch the corresponding receiving step portion when the second tubular member is rotated circumferentially in the aforementioned other direction relative to the first tubular member is formed between each press applying surface portion and its adjacent press applying surface portion of the second tubular member. As the catching step portions of the second tubular member catch the receiving step portions of the first tubular member when the second tubular member is rotated in the other direction circumferentially relative to the first tubular member, the second tubular member is prevented from rotating more than necessary and is therefore free from the problem of becoming undesirably secured.

According to yet another feature of the invention, the first tubular member is provided with a receiving member which is snugly fitted in the bottom of the first tubular member and has a cross section having a shape similar to that of the first tubular base member, and the second tubular member is provided with a catching member which is snugly fitted around the outer surface of the upper end of the second tubular member, has a cross section having a shape similar to that of the second tubular member and is adapted to catch said receiving member when the second tubular member projects to its fullest extent. As the catching member of the second tubular member catches said receiving member of the first tubular member when the second tubular member projects to its fullest extent, the structure described above ensures reliable prevention of undesirable displacement of the second tubular member.

A telescopic unit according to yet another feature of the invention includes a first tubular member whose cross section is in the shape of an involute curve or a similarly shaped curve, and a second tubular member which is inserted in the first tubular member so as to be capable of rotating in the circumferential directions and enabling the adjustment of the distance by which the second tubular member projects from the first tubular member and has a cross section that is in the shape of an involute curve or a similarly shaped curve and corresponds to the cross section of the first tubular member, wherein rotation of the second tubular member in one direction circumferentially relative to the first tubular member causes the outer surface of said second tubular member to be pressed against the inner surface of the first tubular member, thereby securing the second tubular member to the first tubular member; and rotation of the second tubular member in the other direction circumferentially relative to the first tubular member releases the outer surface of the second tubular member and the inner surface of the first tubular member from the press-contact with each other so that the distance by which the second tubular member projects from the first tubular member can be adjusted. With the configuration as above, in the state where the second tubular member is secured to the first tubular member, the outer surface of the second tubular member, whose cross section is in the shape of an involute curve or a similarly shaped curve, is pressed against the inner surface of the first tubular member, whose cross section is in the shape of an involute curve or a similarly shaped curve, with securing force that is sufficient compared with the conventional art. As a result of the configuration described above, the present invention provides a telescopic unit which is of simple structure and convenient to handle and, by means of said sufficient securing force, capable of preventing rattling when in use.

A telescopic unit according to yet another feature of the invention includes a first tubular member whose cross section has a shape comprised of a combination of identical parts of either an involute curve or a similarly shaped curve, and a second tubular member which is inserted in the first tubular member so as to be capable of rotating in the circumferential directions and enabling the adjustment of the distance by which the second tubular member projects from the first tubular member and has a cross section whose shape corresponds to that of the first tubular member and is comprised of a combination of identical parts of either an involute curve or a similarly shaped curve, wherein rotation of the second tubular member in one direction circumferentially relative to the first tubular member causes the outer surface of said second tubular member to be pressed against the inner surface of the first tubular member, thereby securing the second tubular member to the first tubular member; and rotation of the second tubular member in the other direction circumferentially relative to the first tubular member releases the outer surface of the second tubular member and the inner surface of the first tubular member from the press-contact with each other so that the distance by which the second tubular member projects from the first tubular member can be adjusted. With the configuration as above, in the state where the second tubular member is secured to the first tubular member, the outer surface of the second tubular member, whose cross section has a shape comprised of identical parts of either an involute curve or a similarly shaped curve, is pressed against the inner surface of the first tubular member, whose cross section has a shape comprised of a combination of identical parts of either an involute curve or a similarly shaped curve, with securing force that is sufficient compared with the conventional art. As a result of the configuration described above, the present invention provides a telescopic unit which is of simple structure and convenient to handle and, by means of said sufficient securing force, capable of preventing rattling when in use.

A tripod according to the invention includes a base which is provided with leg attachments, and telescopic units which are in accordance with any one of the features of the invention described above and respectively attached to said leg attachments. By using telescopic units attached to the leg attachments of the base as the legs of a tripod, it is possible to prevent rattling of the tripod when in use.

PREFERRED EMBODIMENT OF THE INVENTION

Next, an embodiment of a telescopic unit according to the present invention is explained hereunder, referring to relevant drawings.

Figure 7:
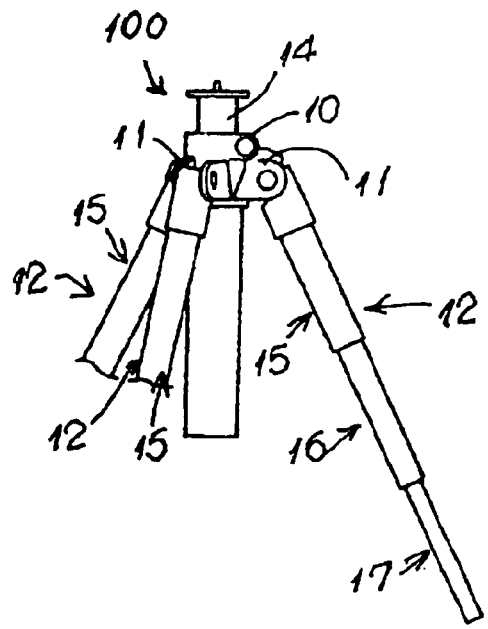
FIG. 7 is a perspective of telescopic units used in a tripod.

A tripod 100 shown in FIG. 7 has a leg structure comprising extensible legs, each of which consists of a plural number of segments, e.g. three segments. Tripod 100 is provided with a base 10 which has three leg attachments 11. A telescopic unit 12 that serves as a leg unit is attached to each leg attachment 11 so that tripod 100 can be closed or opened as needed. An elevator rod 14 passes through the base 10 in such a way that the height of the elevator rod 14 can be adjusted. A panhead (not shown) to be used with a camera is mounted on the top of the elevator rod 14.

As shown in FIGS. 1 through 5, each telescopic unit 12 has a first tubular member 15, in which a second tubular member 16 having a diameter smaller than that of the first tubular member 15 is inserted in such a way as to be capable of rotating circumferentially and permit the distance by which the second tubular member 16 projects from the first tubular member 15 to be adjusted. A third tubular member 17 having a diameter smaller than that of the second tubular member 16 is inserted in the second tubular member 16 in such a way as to be capable of rotating circumferentially and enables the adjustment of the distance by which the third tubular member 17 projects from the second tubular member 16.

The first tubular member 15 has a first tubular base member 21 which has a long, narrow, thin-walled tubular shape and may be made of aluminum. The cross section of the first tubular base member 21 has a shape comprised of a combination of three given arcs corresponding to arcs A, B, C shown in FIG. 6, wherein the arcs A, B, C are arranged such that their centers are respectively located at the three apexes of a equilateral reference triangle X located at the center of the cross section. In other words, the three arcs are arranged so as to form step like portion at each one of a plural number of locations, e.g. three locations, which are arranged at equal intervals in the circumferential direction. With the structure described above, the first tubular base member 21 itself has a function of a cam.

Figure 1:
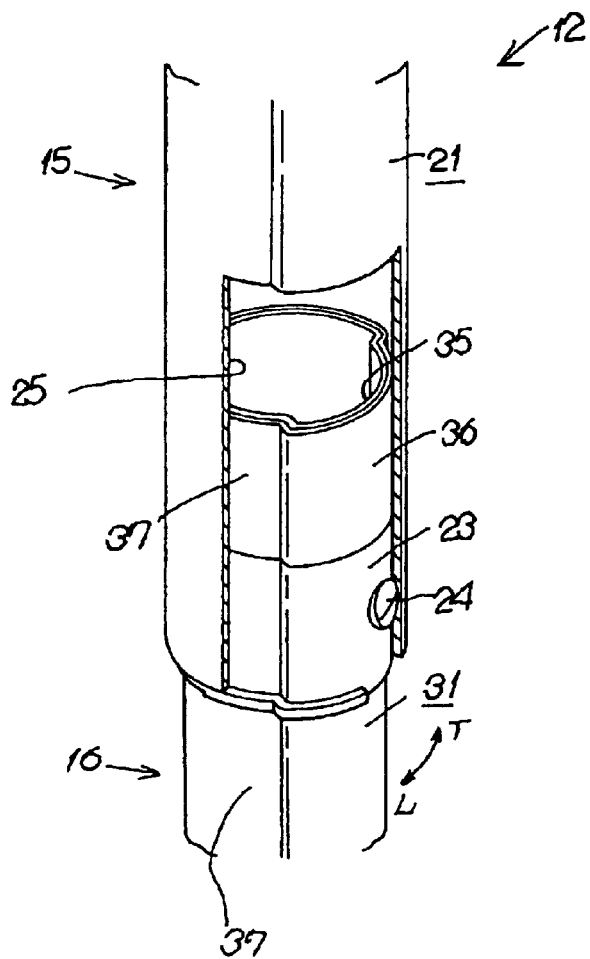
FIG. 1 is a perspective of an embodiment of a telescopic unit according to the present invention, wherein the telescopic unit is in the extended state.
Figure 2:
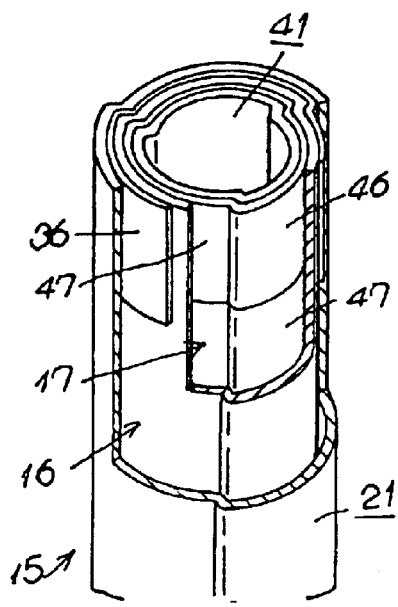
FIG. 2 is a perspective of said telescopic unit in the contracted state.

A receiving member 23 having a thin-walled tubular shape is snugly fitted in the lower end of the first tubular base member 21. The receiving member 23 has a cross section having a shape which is similar to but slightly smaller than that of the first tubular base member 21. As shown in FIG. 1, a protrusion 24 for positioning and securing the first tubular base member 21 is formed on the outer surface of the first tubular base member 21.

A plural number of press receiving surface portions 25, for example three press receiving surface portions 25, are formed on the inner cylindrical surface of the first tubular member 15. Each press receiving surface portion 25 has a cross section which has an arc-shaped surface such that the center axis of the arc extends in parallel with the center axis of the first tubular member 15. The press receiving surface portions 25 are arranged in the circumferential direction, at equal intervals from one axial end to the other axial end.

In other words, the press receiving surface portions 25, each of which is formed in the shape of a narrow, vertically extending curved surface and having an arc-shaped cross section and position such that its center axis extends in parallel with the center axis of the aforementioned first tubular base member 21, are formed on the inner cylindrical surface of the first tubular base member 21 except for its bottom portion and also formed on the inner cylindrical surface of the receiving member 23, which extends continuously from the inner cylindrical surface of the first tubular base member 21.

Figure 6:
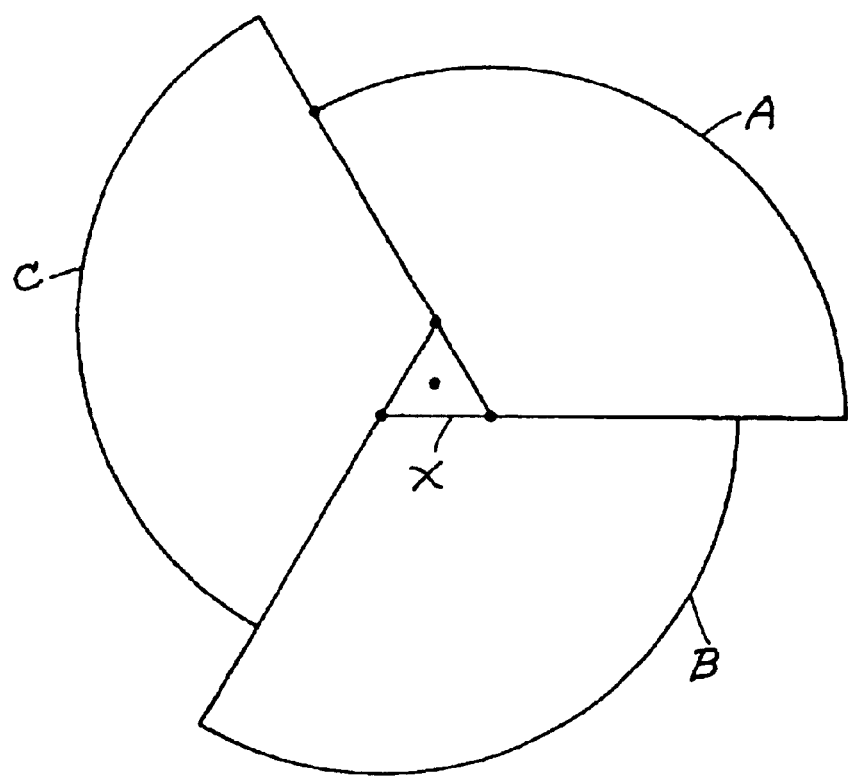
FIG. 6 is a schematic illustration to explain the shape of a cross section of a first tubular member of said telescopic unit.

The aforementioned second tubular member 16 has a second tubular base member 31 which has a long, narrow, thin-walled tubular shape and may be made of aluminum. The cross section of the second tubular base member 31 has a shape comprised of a combination of three given arcs which are arranged such that their centers are respectively located at the three apexes of a common equilateral reference triangle, which is shown in FIG. 6 and located at the center of the cross section. In other words, the three arcs are arranged so as to form step-like portion at each one of a plural number of locations, e.g. three locations, which are arranged at equal intervals in the circumferential direction. With the structure described above, the second tubular base member 31 itself has a function of a cam.

A receiving member (not shown) having a thin-walled tubular shape is snugly fitted in the lower end of the second tubular base member 31. The receiving member has a cross section having a shape which is similar to but slightly smaller than that of the second tubular base member 31. A protrusion (not shown) for positioning and securing the second tubular base member 31 is formed on the outer surface of the second tubular base member 31.

A plural number of press receiving surface portions 35, for example three press receiving surface portions 35, are formed on the inner cylindrical surface of the second tubular member 16. Each press receiving surface portion 35 has a cross section which has an arc-shaped surface such that the center axis of the arc extends in parallel with the center axis of the second tubular member 16. The press receiving surface portions 35 are arranged in the circumferential direction, at equal intervals from one axial end to the other axial end.

In other words, the press receiving surface portions 35, each of which is formed in the shape of a narrow, vertically extending curved surface having an arc-shaped cross section and is positioned such that its center axis extends in parallel with the center axis of the aforementioned second tubular base member 31, are formed on the inner cylindrical surface of the second tubular base member 31 except for its bottom portion and also formed on the inner cylindrical surface of the aforementioned receiving member (not shown), which extends continuously from the inner cylindrical surface of the second tubular base member 31.

A catching member 36 having a thin-walled tubular shape is snugly fitted around the outer surface of the upper end of the second tubular base member 31. The catching member 36 is adapted to catch the receiving member 23 of the first tubular member 15 when the second tubular member 16 projects from the first tubular member 15 to its fullest extent. The catching member 36 has a cross section having a shape which is similar to but slightly larger than that of the second tubular base member 31.

A plural number of press applying surface portions 37, for example three press applying surface portions 37, are formed on the inner cylindrical surface of the second tubular member 16. Each press applying surface portion 37 has a cross section which has an arc-shaped surface such that the center axis of the arc extends in parallel with the center axis of the second tubular member 16. The press applying surface portions 37 are arranged in the circumferential direction, at equal intervals from one axial end to the other axial end.

In other words, the press applying surface portions 37, each of which is formed in the shape of a narrow, vertically extending curved surface having an arc-shaped cross section and is positioned such that its center axis extends in parallel with the center axis of the aforementioned second tubular base member 31, are formed on the outer cylindrical surface of the second tubular base member 31 except for its upper end and also formed on the outer cylindrical surface of the aforementioned catching member 36, which extends continuously from the outer cylindrical surface of the second tubular base member 31.

The aforementioned third tubular member 17 has a third tubular base member 41 which has a long, narrow, thin-walled tubular shape and may be made of aluminum. The cross section of the third tubular base member 41 has a shape comprised of a combination of three given arcs which are arranged such that their centers are respectively located at the three apexes of a common equilateral reference triangle, which is shown in FIG. 6 and located at the center of the cross section. In other words, the three arcs are arranged so as to form step-like portion at each one of a plural number of locations, e.g. three locations, which are arranged at equal intervals in the circumferential direction. With the structure described above, the third tubular base member 41 itself has a function of a cam.

The respective cross sections of the first tubular base member 21, the second tubular base member 31 and the third tubular base member 41 are similar in shape, which is comprised of a combination of three given arcs arranged such that their centers are respectively located at the three apexes of a common equilateral reference triangle X.

A catching member 46 having a thin-walled tubular shape is snugly fitted around the outer surface of the upper end of the third tubular base member 41. The catching member 46 is adapted to catch the receiving member (not shown) of the second tubular member 16 when the third tubular member 17 projects from the second tubular member 16 to its fullest extent. The catching member 46 has a cross section having a shape which is similar to but slightly larger than that of the third tubular base member 41.

A plural number of press applying surface portions 47, for example three press applying surface portions 47, are formed on the inner cylindrical surface of the third tubular member 17. Each press applying surface portion 47 has a cross section which has an arc-shaped surface such that the center axis of the arc extends in parallel with the center axis of the third tubular member 17. The press applying surface portions 47 are arranged in the circumferential direction, at equal intervals from one axial end to the other axial end.

In other words, the press applying surface portions 47, each of which is formed in the shape of a narrow, vertically extending curved surface having an arc-shaped cross section and is positioned such that its center axis extends in parallel with the center axis of the aforementioned third tubular base member 41, are formed on the outer cylindrical surface of the third tubular base member 41 except for its upper end and also formed on the outer cylindrical surface of the aforementioned catching member, which extends continuously from the outer cylindrical surface of the third tubular base member 41.

Figure 3:
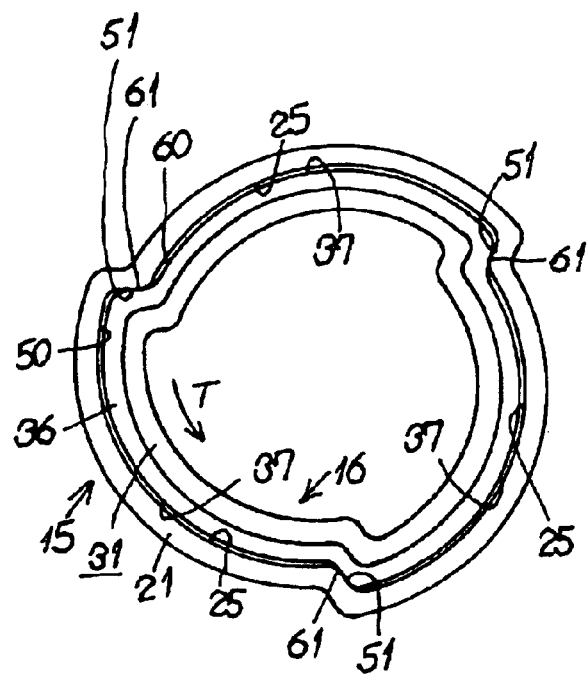
FIG. 3 is a sectional view of said telescopic unit, showing when the telescopic unit is released from a secured state.
Figure 4:
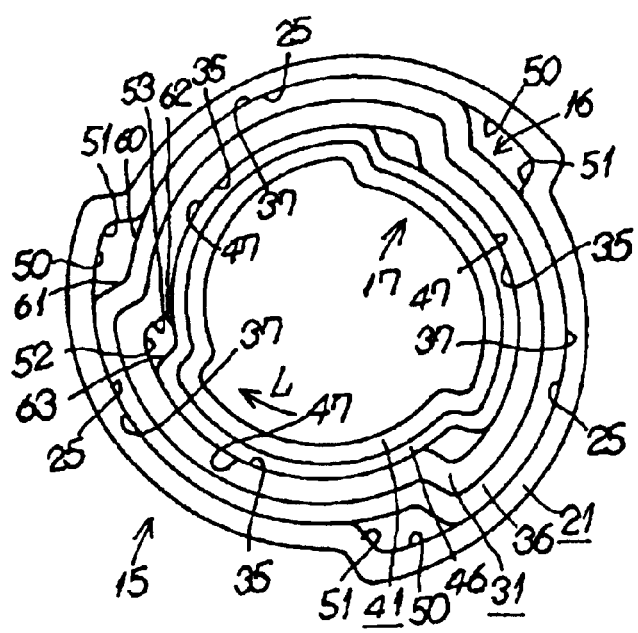
FIG. 4 is a sectional view of said telescopic unit in the secured state.
Figure 5:
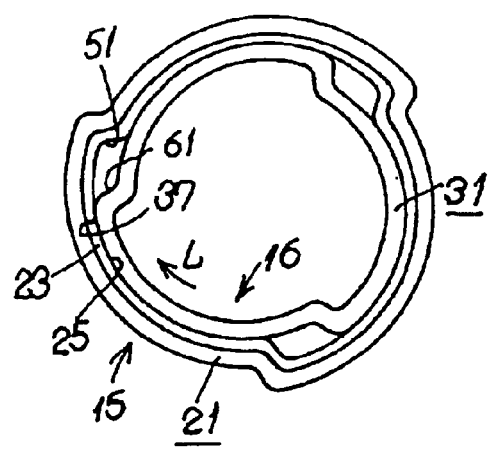
FIG. 5 is a sectional view of said telescopic unit in the secured state.

As shown in FIGS. 3 and 4, a receiving step portion 51 and a connecting portion 50 are formed between each press receiving surface portion 25 of the first tubular member 15 and its adjacent press receiving surface portion 25 as an integral, continuous surface, with the connecting portion 50 located between the press receiving surface portion 25 and the receiving step portion 51. A receiving step portion 53 and a connecting portion 52 are formed between each press receiving surface portion 35 of the second tubular member 16 and its adjacent press receiving surface portion 35 as an integral, continuous surface, with the connecting portion 52 located between the press receiving surface portion 35 and the receiving step portion 53.

A catching step portion 61 and a connecting portion 60 are formed between each press applying surface portion 37 of the second tubular member 16 and its adjacent press applying surface portion 37, with the connecting portion 60 located between the press applying surface portion 37 and the catching step portion 61. Each catching step portion 61 is adapted to catch the corresponding receiving step portion 51 when the second tubular member 16 is rotated in the other direction circumferentially relative to the first tubular member 15. A catching step portion 63 and a connecting portion 62 are formed between each press applying surface portion 47 of the third tubular member 17 and its adjacent press applying surface portion 47, with the connecting portion 62 located between the press applying surface portion 47 and the catching step portion 63. Each catching step portion 63 is adapted to catch the corresponding receiving step portion 53 when the third tubular member 17 is rotated in the other direction circumferentially relative the second tubular member 16.

Next, the function of the embodiment described above is explained hereunder.

When using the tripod in the state where, for example, the telescopic units 12 serving as the legs of the tripod are extended to the fullest extent, the second tubular members 16 are arranged to project from their respective first tubular members 15 to the fullest extent, and the third tubular members 17, too, are arranged to project from their respective second tubular members 16 to the fullest extent.

When each third tubular member 17, which is located at the lower end of each respective telescopic unit 12, is rotated in one direction circumferentially (represented by "T" in the drawings) by a given degree in the released state where the second tubular members 16 and the third tubular members 17 project to the fullest extent, the second tubular members 16 become secured to the first tubular members 15, and the third tubular members 17, too, become secured to the second tubular members 16 nearly simultaneously with the securing of the second tubular members 16. Thus, all the segments of the tripod are secured.

In other words, as a result of rotation of the third tubular members 17, the second tubular members 16 rotate together with the third tubular members 17 so that given locations of the press applying surface portions 37 of each second tubular member 16, i.e. the parts located at the outer surface of the catching member 36 and the parts near the upper end of the outer surface of the second tubular base member 31, are pressed against the corresponding parts of the press receiving surface portions 25 of the first tubular member 15, i.e. the parts of the press receiving surface portions 25 facing the aforementioned parts of the press applying surface portions 37. Thus, the second tubular members 16 are secured to the first tubular members 15. Nearly simultaneously with the securing of the second tubular members 16, given locations of the press applying surface portions 47 of each third tubular member 17, i.e. the parts located at the outer surface of the catching member 46 and the parts near the upper end of the outer surface of the third tubular base member 41, are pressed against the corresponding parts of the press receiving surface portions 35 of the second tubular member 16, i.e. the parts of the press receiving surface portions 35 facing the aforementioned parts of the press applying surface portions 47. Thus, the third tubular members 17 are secured to the second tubular members 16.

When contracting the extended telescopic units 12 after using the tripod, the third tubular member 17 at the lower end of each telescopic unit is rotated in the other direction circumferentially (represented by "L" in the drawings) by a given degree.

When the third tubular members 17 is rotated, the second tubular member 16 rotates together with the third tubular member 17 so that the press applying surface portions 37,47 are released from press-contact with the corresponding press receiving surface portions 25,35. As a result, the third tubular member 17 is released from the secured state to the second tubular member 16, while the second tubular member 16 is released from the secured state to the first tubular member 15.

In the course of rotation of each third tubular member 17, the catching step portions 61 of the second tubular member 16 removably catch the receiving step portions 51 of the first tubular member 15, while the catching step portions 63 of the third tubular member 17 removably catch the receiving step portions 53 of the second tubular member 16 so that the second tubular member 16 and the third tubular member 17 are prevented from rotating more than necessary. Therefore, the embodiment described above is free from the problem of a telescopic unit becoming undesirably secured, which problem may be caused by inadvertent reverse rotation in case of a conventional telescopic unit.

After all the leg segments of a telescopic unit 12 are released from a secured state, the telescopic unit 12 can easily be contracted by appropriately reducing the distance by which the third tubular member 17 projects from the second tubular member 16 and also appropriately reducing the distance by which the second tubular member 16 projects from the first tubular member 15.

As, described above, when the first through the third tubular members 15, 16, 17 of the embodiment described above are in the secured state, two parts at given locations of each press applying surface portion 37/47 are pressed against the parts of the corresponding press receiving surface portion 25/35, which parts respectively face said two parts of the press applying surface portion 37/47. Therefore, the area where the press applying surface portions are pressed against the press receiving surface portions is greater than that of the conventional structure. In other words, as each tubular member 15/16/17 is adapted to be pressed against an adjacent tubular member at two location, i.e. the catching member 36/46 and the corresponding receiving member (23 or the one not shown in the drawings), the area of the contact surface is greater than that of the conventional structure where each tubular member is adapted to be pressed against an adjacent tubular member at only a single location. As a result, the embodiment ensures sufficient securing force distributed in the circumferential direction and, by means of said sufficient securing force, enables the reliable prevention of rattling when in use.

Another benefit of the present embodiment lies in that it is convenient to handle because the first through the third tubular members 15,16,17 can be secured or released merely by rotating the third tubular member 17, which is the bottommost tubular member.

Furthermore, as there is no need of a special part, such as a securing device primarily comprised of an operating lever or a cam 5 required by conventional structures for securing the tubular members, the embodiment is capable of reducing the number of necessary parts, thereby providing a lightweight telescopic unit having a simple structure.

Another benefit of elimination of the need of a special part for securing the tubular members lies in that the telescopic extension ratio can be maximized, because it is possible to design the first through the third tubular base members 21,31,41 of the first through the third tubular members 15,16,17 to have the same length, thereby enabling their tops and bottoms to be arranged flush with one another.

The embodiment has been described above, referring to the example wherein three press receiving surface portions 25 arranged at equal intervals in the circumferential direction are formed on the inner cylindrical surface of the first tubular member 15, while three press applying surface portions 37 which are adapted to be pressed against these three press receiving surface portions 25 and arranged at equal intervals in the circumferential direction are formed on the outer cylindrical surface of the second tubular member 16. However, the same effects can be achieved by a slightly different structure, such as the one shown in FIG. 8, wherein two press receiving surface portions 25a located nearly opposite each other are formed on the inner cylindrical surface of the first tubular member 15a, while two press applying surface portions 37a adapted to be respectively pressed against the two press receiving surface portions 25s are formed on the outer cylindrical surface of the second tubular member 16a. Both the first tubular member 15a and the second tubular member 16a have a cross section shaped by a combination of two given arcs.

Figure 9:
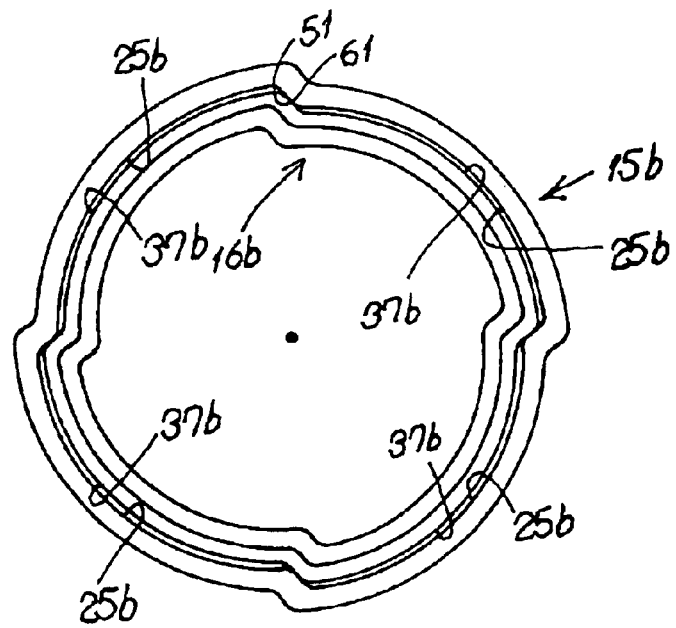
FIG. 9 is a sectional view of yet another embodiment of a telescopic unit according to the present invention.

The same effects can be achieved also by a structure shown in FIG. 9, wherein four press receiving surface portions 25b arranged at equal intervals in the circumferential direction are formed on the inner cylindrical surface of the first tubular member 15b, while four press applying surface portions 37b which are adapted to be pressed against these four press receiving surface portions 25b and arranged at equal intervals in the circumferential direction are formed on the outer cylindrical surface of the second tubular member 16b. In this structure, both the first tubular member 15b and the second tubular member 16b have a cross section shaped by a combination of four given arcs which are arranged such that their centers are respectively located at the four apexes of a common reference square (not shown), which is located at the center of the cross section.

Figure 10:
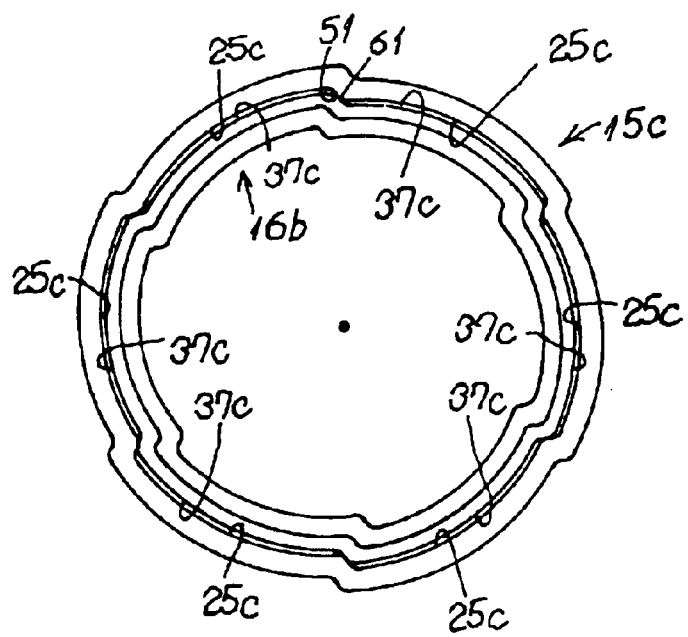
FIG. 10 is a sectional view of yet another embodiment of a telescopic unit according to the present invention.

The same effects can be achieved also by a structure shown in FIG. 10, wherein six press receiving surface portions 25c arranged at equal intervals in the circumferential direction are formed on the inner cylindrical surface of the first tubular member 15c, while six press applying surface portions 37c which are adapted to be pressed against these six press receiving surface portions 25c and arranged at equal intervals in the circumferential direction are formed on the outer cylindrical surface of the second tubular member 16c. In this structure, both the first tubular member 15c and the second tubular member 16c have a cross section shaped by a combination of six given arcs which are arranged such that their centers are respectively located at the six apexes of a common reference hexagon (not shown), which is located at the center of the cross section. It is to be noted that the greater the number of press receiving surface portions 25 and press applying surface portions 37, the greater the securing force to secure the second tubular member 16 to the first tubular member 15.

Figure 11:
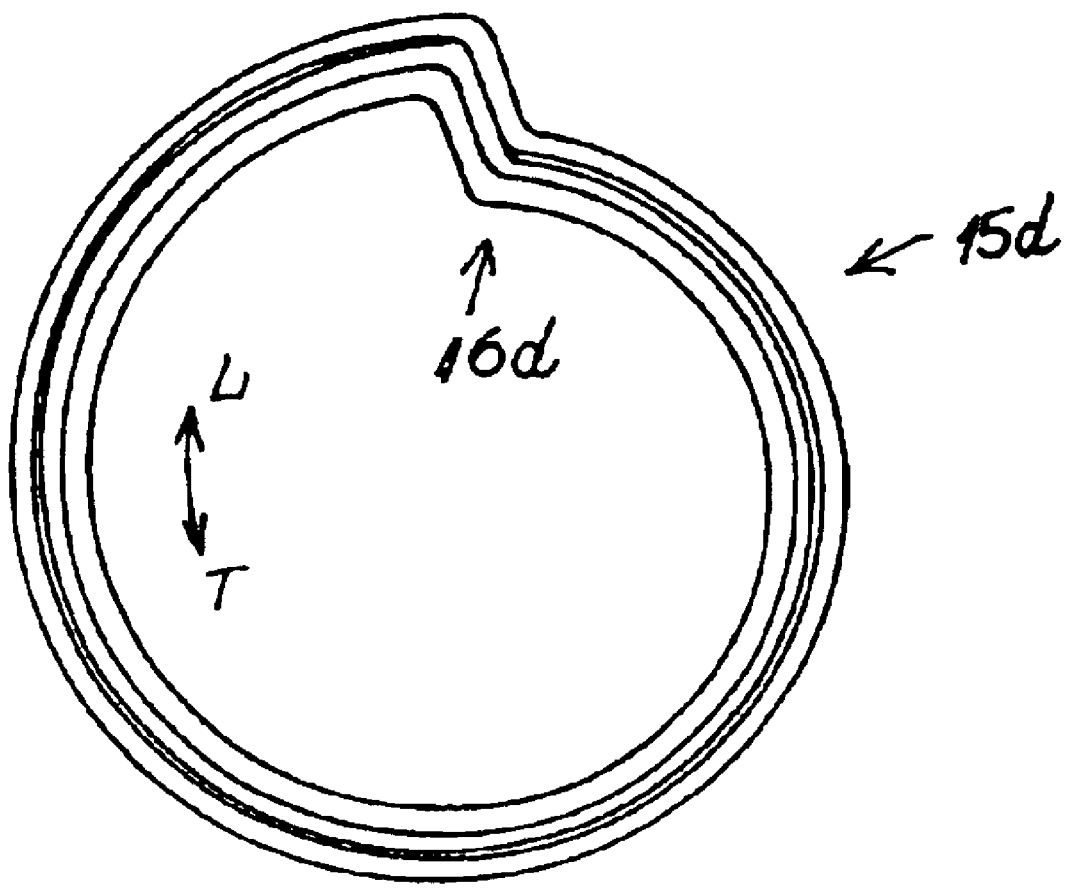
FIG. 11 is a sectional view of yet another embodiment of a telescopic unit according to the present invention.
Figure 12:
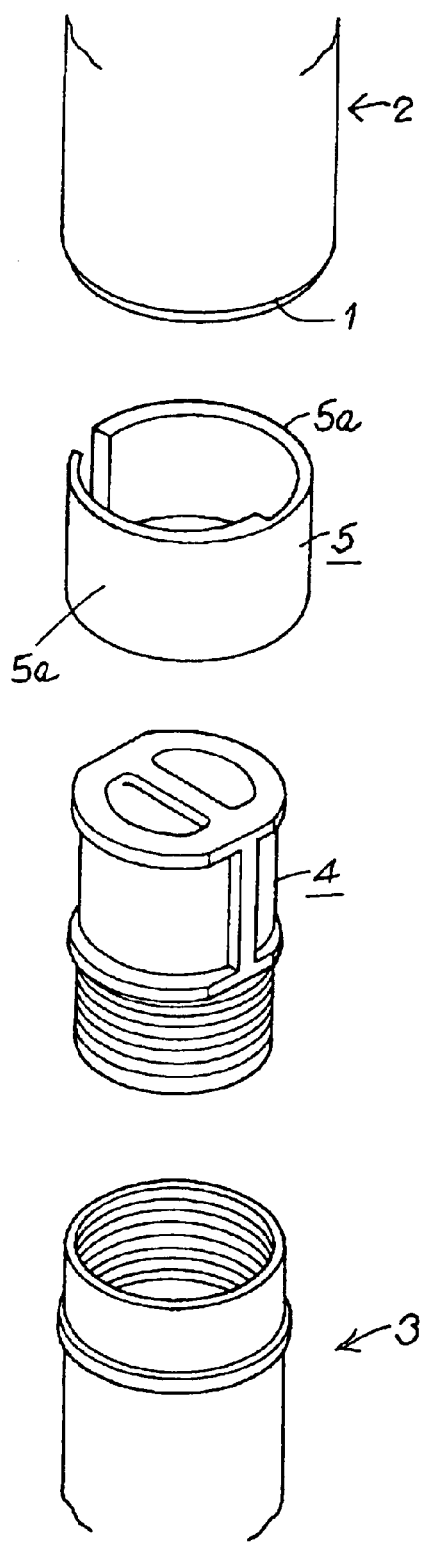
FIG. 12 is an exploded perspective of a conventional telescopic unit.

Another example of structures that can achieve the same effects including the ability of providing sufficient securing force to prevent rattling of the telescopic unit when in use is shown in FIG. 11. The structure shown in FIG. 11 calls for designing the cross section of the first tubular member 15d to have a shape resembling an involute curve and designing the cross section of the second tubular member 16d to have a shape that resembles an involute curve and corresponds to the shape of the first tubular member 15d so that rotation of the second tubular member 16d in one direction circumferentially (represented by "T" in the drawings) relative to the first tubular member 15d causes given locations on the outer surface of the second tubular member 16d to be pressed against the corresponding locations on the inner surface of the first tubular member 15d and that rotation of the second tubular member 16d in the other direction circumferentially (represented by "L" in the drawings) relative to the first tubular member 15d releases the inner surface of the first tubular member 15d and the outer surface of the second tubular member 16d from the press-contact with each other. Although it is not shown in the drawings, the same effects can be achieved also by a structure whose first tubular member and second tubular member have a cross section in the shape of an involute curve instead of a shape resembling an involute curve.

Figure 8:
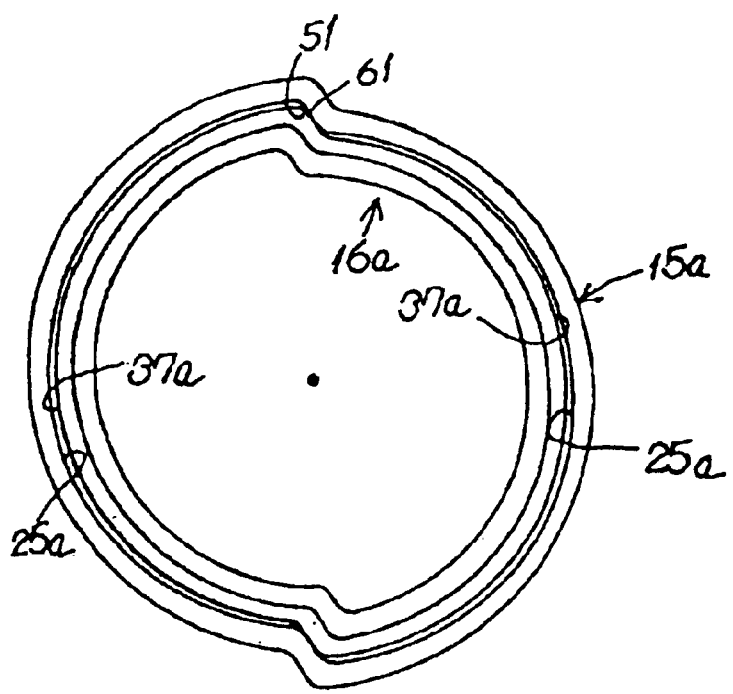
FIG. 8 is a sectional view of another embodiment of a telescopic unit according to the present invention.

The invention has been described above, referring to various structures, the one shown in FIG. 3 wherein the first tubular member 15 and the second tubular member 16 have a cross section shaped by a combination of three given arcs, the one shown in FIG. 8 wherein the first tubular member 15a and the second tubular member 16a have a cross section shaped by a combination of two given arcs, the one shown in FIG. 9 wherein the first tubular member 15b and the second tubular member 16b have a cross section shaped by a combination of four given arcs and the one shown in FIG. 10 wherein the first tubular member 15c and the second tubular member 16c have a cross section shaped by a combination of six given arcs. However, although it is not shown in the drawings, a cross section shaped by a combination of identical parts of either an involute curve or a similarly shaped curve can achieve the same effects.

The catching member 36 and the receiving member 23, which are included in the above embodiment in order to prevent undesirable displacement of the second tubular member 16 from the first tubular member 15, are not essential. For example, a structure that calls for securing the second tubular member to the first tubular member by means of press-contact between press applying surface portions and press receiving surface portions, all of which are located where the first tubular member overlaps the second tubular member, is also permissible.

Although the tripod of the embodiment explained above has a leg structure comprising extensible legs, each of which consists of three segments that form a telescopic unit 12, an extensible leg structure consisting of two, four or more segments is also permissible.

Furthermore, according to the embodiments described above, the telescopic units 12 are used for a tripod. However, a telescopic unit 12 of the invention is not limited to a tripod but also applicable to a stand of other types or other similar devices.

POSSIBLE INDUSTRIAL APPLICATION

As described above, a tripod according to the invention may be used as, for example, a portable stand having a leg structure comprising extensible legs, each of which may consist of three segments.

What is claimed is:

1. A telescopic unit including:

a first tubular member whose cross section is in the shape of an involute curve;

a second tubular member whose cross section is in the shape of an involute curve, which is inserted in said first tubular member so as to be capable of rotating in the circumferential directions and enabling the adjustment of the distance by which the second tubular member projects from the first tubular member;

a receiving member in the bottom of said first tubular member; and a catching member on the outer surface of the upper end of said second tubular member, said catching member being adapted to catch said receiving member when said second tubular member projects to its fullest extent; wherein:

one or more press receiving surface portions are formed on the inner cylindrical surface of the first tubular member, said press receiving surface portions having a cross section which has an arc-shaped surface such that the center axis of the arc extends in parallel with the center axis of said first tubular member;

one or more press applying surface portions are formed on the outer cylindrical surface of the second tubular member, said press applying surface portions having a cross section which has an arc-shaped surface such that the center axis of the arc extends in parallel with the center axis of said second tubular member;

rotation of the second tubular member in one direction circumferentially relative to the first tubular member causes given locations of the press applying surface portions to be pressed against the press receiving surface portions, thereby securing the second tubular member to the first tubular member;

rotation of the second tubular member in the other direction circumferentially relative to the first tubular member releases the press applying surface portions and the press receiving surface portions from the press-contact with each other so that the distance by which the second tubular member projects from the first tubular member can be adjusted;

rotation of the second tubular member in the other direction is limited so as to prevent the given locations of the press applying surface portions to be pressed against the press receiving surface portions;

said receiving member is snugly fitted in the bottom of the first tubular member and has a cross section having a shape similar to that of the first tubular base member; and said catching member is snugly fitted around the outer surface of the upper end of the second tubular member and has a cross section having a shape similar to that of the second tubular member.

2. A telescopic unit as claimed in claim 1, wherein:

a plural number of press receiving surface portions are formed on the inner surface of the first tubular member so that the press receiving surface portions are arranged in the circumferential direction with a distance between each press receiving surface portion and its adjacent press receiving surface portion; and a plural number of press applying surface portions are formed on the outer surface of the second tubular member so that the press applying surface portions are arranged in the circumferential direction at locations respectively corresponding to said press receiving surface portions, with a distance between each press applying surface portion and its adjacent press applying surface portion.

3. A telescopic unit, according to claim 2, further comprising:
a tripod;
said tripod including a base;
said base including a plurality of leg attachments; and
said telescopic units respectively attached to each said leg attachments.

4. A telescopic unit as claimed in claim 2, wherein:
a receiving step portion is formed between each press receiving surface portion and its adjacent press receiving surface portion of the first tubular member; and
a catching step portion that is adapted to catch the corresponding receiving step portion when the second tubular member is rotated circumferentially in the aforementioned other direction relative to the first tubular member is formed between each press applying surface portion and its adjacent press applying surface portion of the second tubular member.

5. A telescopic unit, according to claim 4, further comprising:
a tripod;
said tripod including a base;
said base including a plurality of leg attachments; and
said telescopic units respectively attached to each said leg attachments.

6. A telescopic unit, according to claim 1, further comprising:
a tripod;
said tripod including a base;
said base including a plurality of leg attachments; and
said telescopic units respectively attached to each said leg attachments.

7. A telescopic unit including:
a first tubular member whose cross section is in the shape of an involute curve;
a second tubular member which is inserted in the first tubular member so as to be capable of rotating in the circumferential directions and enabling the adjustment of the distance by which the second tubular member projects from the first tubular member and has a cross section that is in the shape of an involute curve and corresponds to the cross section of the first tubular member;
a receiving member in the bottom of said first tubular member; and
a catching member on the outer surface of the upper end of said second tubular member, said catching member being adapted to catch said receiving member when said second tubular member projects to its fullest extent; wherein:
rotation of the second tubular member in one direction circumferentially relative to the first tubular member causes the outer surface of said second tubular member to be pressed against the inner surface of the first tubular member, thereby securing the second tubular member to the first tubular member;
rotation of the second tubular member in the other direction circumferentially relative to the first tubular member releases the outer surface of the second tubular member and the inner surface of the first tubular member from the press-contact with each other so that the distance by which the second tubular member projects from the first tubular member can be adjusted;
said receiving member is snugly fitted in the bottom of the first tubular member and has a cross section having a shape similar to that of the first tubular base member; and
said catching member is snugly fitted around the outer surface of the upper end of the second tubular member and has a cross section having a shape similar to that of the second tubular member.

8. A telescopic unit; according to claim 7, further comprising:
a tripod;
said tripod including a base;
said base including a plurality of leg attachments; and
said telescopic units respectively attached to each said leg attachments.

9. A telescopic unit including:
a first tubular member whose cross section has a shape comprised of a combination of identical parts of an involute curve;
a second tubular member which is inserted in the first tubular member so as to be capable of rotating in the circumferential directions and enabling the adjustment of the distance by which the second tubular member projects from the first tubular member and has a cross section whose shape corresponds to that of the first tubular member and is comprised of a combination of identical parts of an involute curve;
a receiving member in the bottom of said first tubular member; and
a catching member on the outer surface of the upper end of said second tubular member, said catching member being adapted to catch said receiving member when said second tubular member projects to its fullest extent; wherein:
rotation of the second tubular member in one direction circumferentially relative to the first tubular member causes the outer surface of said second tubular member to be pressed against the inner surface of the first tubular member, thereby securing the second tubular member to the first tubular member; and
rotation of the second tubular member in the other direction circumferentially relative to the first tubular member releases the outer surface of the second tubular member and the inner surface of the first tubular member from the press-contact with each other so that the distance by which the second tubular member projects from the first tubular member can be adjusted;
said receiving member is snugly fitted in the bottom of the first tubular member and has a cross section having a shape similar to that of the first tubular base member; and
said catching member is snugly fitted around the outer surface of the upper end of the second tubular member and has a cross section having a shape similar to that of the second tubular member.

10. A telescopic unit, according to claim 9, further comprising;
a tripod;
said tripod including a base;
said base including a plurality of leg attachments; and
said telescopic units respectively attached to each said leg attachments.

* * * * *